(12) United States Patent
Vithaldas

(10) Patent No.: US 11,807,240 B2
(45) Date of Patent: Nov. 7, 2023

(54) METHODS AND SYSTEMS FOR EVALUATING VEHICLE BEHAVIOR

(71) Applicant: Toyota Research Institute, Inc., Los Altos, CA (US)

(72) Inventor: Sachit P. Vithaldas, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 519 days.

(21) Appl. No.: 16/913,241

(22) Filed: Jun. 26, 2020

(65) Prior Publication Data

US 2021/0402997 A1    Dec. 30, 2021

(51) Int. Cl.
    *B60W 30/18*      (2012.01)
    *G06F 8/34*      (2018.01)
    *G01C 21/36*      (2006.01)

(52) U.S. Cl.
    CPC ... *B60W 30/18163* (2013.01); *G01C 21/3614* (2013.01); *G06F 8/34* (2013.01); *B60W 2554/4045* (2020.02); *B60W 2554/4046* (2020.02)

(58) Field of Classification Search
    CPC ... B60W 30/18163; B60W 2554/4045; B60W 2554/4046; G01C 21/3614; G06F 8/34
See application file for complete search history.

(56) References Cited

U.S. PATENT DOCUMENTS

| | | | |
|---|---|---|---|
| 6,876,314 | B1 | 4/2005 | Lin |
| 8,543,366 | B2 | 9/2013 | Pree et al. |
| 9,159,234 | B2 | 10/2015 | Dirndorfer et al. |
| 9,440,148 | B2 | 9/2016 | Bond et al. |
| 10,230,583 | B1 | 3/2019 | Cheng et al. |
| 2014/0121897 | A1* | 5/2014 | Felkins ............... B60W 50/14 701/1 |
| 2017/0061799 | A1* | 3/2017 | Fujii ..................... G08G 1/167 |
| 2018/0061151 | A1* | 3/2018 | Chainer ................ H04W 4/40 |
| 2018/0079420 | A1* | 3/2018 | Aine ..................... B60W 30/16 |
| 2019/0009784 | A1* | 1/2019 | Takeda ............ B60W 30/18154 |

(Continued)

FOREIGN PATENT DOCUMENTS

| | | |
|---|---|---|
| JP | 11272158 A | 10/1999 |
| KR | 1020170127871 A | 11/2017 |
| KR | 101887265 B1 | 8/2018 |

*Primary Examiner* — Peter D Nolan
*Assistant Examiner* — Ashley L Redhead, Jr.
(74) *Attorney, Agent, or Firm* — Dinsmore & Shohl LLP

(57) ABSTRACT

A system for evaluating behavior of vehicles is provided. The system includes an input device configured to receive a request for evaluation of behavior of vehicles, one or more processors, one or more memory modules communicatively coupled to the one or more processors; and machine readable instructions stored in the one or more memory modules. The machine readable instructions, when executed by the one or more processors, cause the system to: collect log files related to vehicles from a plurality of sources, a format of log files from one source being different from a format of log files from another source, extract one or more parameters for the vehicles from the collected log files based on the request for evaluation, and evaluate behavior of the vehicles based on the extracted one or more parameters, wherein the one or more parameters include time series and time intervals.

19 Claims, 8 Drawing Sheets

(56) References Cited

U.S. PATENT DOCUMENTS

| | | | |
|---|---|---|---|
| 2019/0071098 A1* | 3/2019 | Asakura | B60W 50/14 |
| 2019/0084579 A1* | 3/2019 | Maura | B60W 30/10 |
| 2019/0382004 A1* | 12/2019 | Golov | B60W 60/001 |
| 2020/0008028 A1* | 1/2020 | Yang | G08G 1/0175 |
| 2020/0062249 A1* | 2/2020 | Light | G05D 1/0088 |
| 2021/0061282 A1* | 3/2021 | Jafari Tafti | B60W 60/00276 |
| 2022/0126878 A1* | 4/2022 | Moustafa | B60W 60/0053 |

* cited by examiner t = t₂
POSITION INTERPOLATED

METHODS AND SYSTEMS FOR EVALUATING VEHICLE BEHAVIOR

TECHNICAL FIELD

The present specification relates to systems and methods for evaluating vehicle behavior, and more particularly, to systems and methods that allow individuals that are unfamiliar with programming to prepare schemes for complex evaluations of vehicle behavior.

BACKGROUND

It is a time intensive process for a systems engineer to establish a requirement in code form. For example, it is very time intensive to code parameters and conduct actual testing with respect to discovering regions where a vehicle is making a lane change and ensuring that the vehicle stays a particular distance away from other vehicles when the vehicle makes a lane change. In addition, such coding may be foreign to the systems engineer having little coding experience.

Accordingly, a need exists for providing a scheme that allows individuals that are unfamiliar with programming to prepare schemes for complex evaluations of vehicle behavior.

SUMMARY

The present disclosure provides systems and methods for evaluating vehicle behavior. The present system allows a user with little programming experience to build blocks for evaluating vehicle parameters without generating program code that is difficult and time-consuming. Program modules in the system, such as extractors, may extract parameters necessary for evaluation from a plurality of sources, and apply the parameters to the blocks built by the user.

In one embodiment, a system for evaluating behavior of vehicles includes an input device configured to receive a request for evaluation of behavior of vehicles, one or more processors, one or more memory modules communicatively coupled to the one or more processors, and machine readable instructions stored in the one or more memory modules that, when executed by the one or more processors, cause the system to: collect log files related to vehicles from a plurality of sources, a format of log files from one source being different from a format of log files from another source, extract one or more parameters for the vehicles from the collected log files based on the request for evaluation, and evaluate behavior of the vehicles based on the extracted one or more parameters, wherein the one or more parameters include time series information and time intervals.

In another embodiment, a method for evaluating behavior of vehicles is provided. The method includes collecting log files related to vehicles from a plurality of sources, a format of log files from one source being different from a format of log files from another source, extracting one or more parameters for the vehicles from the collected log files based on the request for evaluation, and evaluating behavior of the vehicles based on the extracted one or more parameters, wherein the one or more parameters include time series information and time intervals.

In yet another embodiment, a non-transitory computer readable medium has stored thereon software instructions that, when executed by a processor, cause the processor to evaluate behavior of vehicles, by executing steps including collecting log files related to vehicles from a plurality of sources, a format of log files from one source being different from a format of log files from another source, extracting one or more parameters for the vehicles from the collected log files based on the request for evaluation, and evaluating behavior of the vehicles based on the extracted one or more parameters, wherein the one or more parameters include time series information and time intervals.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The purpose of the present disclosure is to provide a visual scheme for defining test evaluations so that developers and non-developers can quickly and easily develop evaluations of vehicle behavior. By referring to FIGS. 3A and 3B, the present system allows a user with little programming experience to build blocks such as blocks 342, 344, 346, 348, 352, 354 for evaluating vehicle parameters without writing detailed program codes which is difficult and time-consuming. Program modules in the system such as extractors 322, 324, 326 may extract parameters necessary for evaluation of vehicle behaviors from information sources 312, 314, 316, and apply the parameters to the blocks built by the user. For example, the present disclosure evaluates whether vehicles properly change lanes based on various parameters including vehicle locations, orientations, map information, and the like over a certain period of time. As another example, the present disclosure evaluates whether vehicles properly keep their lanes based on various parameters. The parameters may be extracted from a plurality of servers that maintain driving information of vehicles registered to the corresponding server.

The embodiments disclosed herein include systems and methods for evaluating behavior of vehicles. The system includes an input device configured to receive a request for evaluation of behavior of vehicles, one or more processors, one or more memory modules communicatively coupled to the one or more processors, and machine readable instructions stored in the one or more memory modules that, when executed by the one or more processors, cause the system to: collect log files related to vehicles from a plurality of sources, a format of log files from one source being different from a format of log files from another source, extract one or more parameters for the vehicles from the collected log files based on the request for evaluation, and evaluate behavior of the vehicles based on the extracted one or more parameters. The one or more parameters include time series information and time intervals. A time series is an ordered list of combinations of a parameter value and corresponding time. The time series information includes information on the ordered list of combinations of a parameter value and corresponding time.

The present system allows individuals that are unfamiliar with programming to prepare schemes for complex evaluations of vehicle behavior. Embodiments of the present disclosure include a scheme that allows non-programmers or programmers having little experience to take a series of blocks having defined parameters and put the blocks together in order to build a desired evaluation. Accordingly, systems engineers with little programming experience can assemble a requirement for testing of vehicle behavior in an efficient and accurate manner.

Figure 1A:
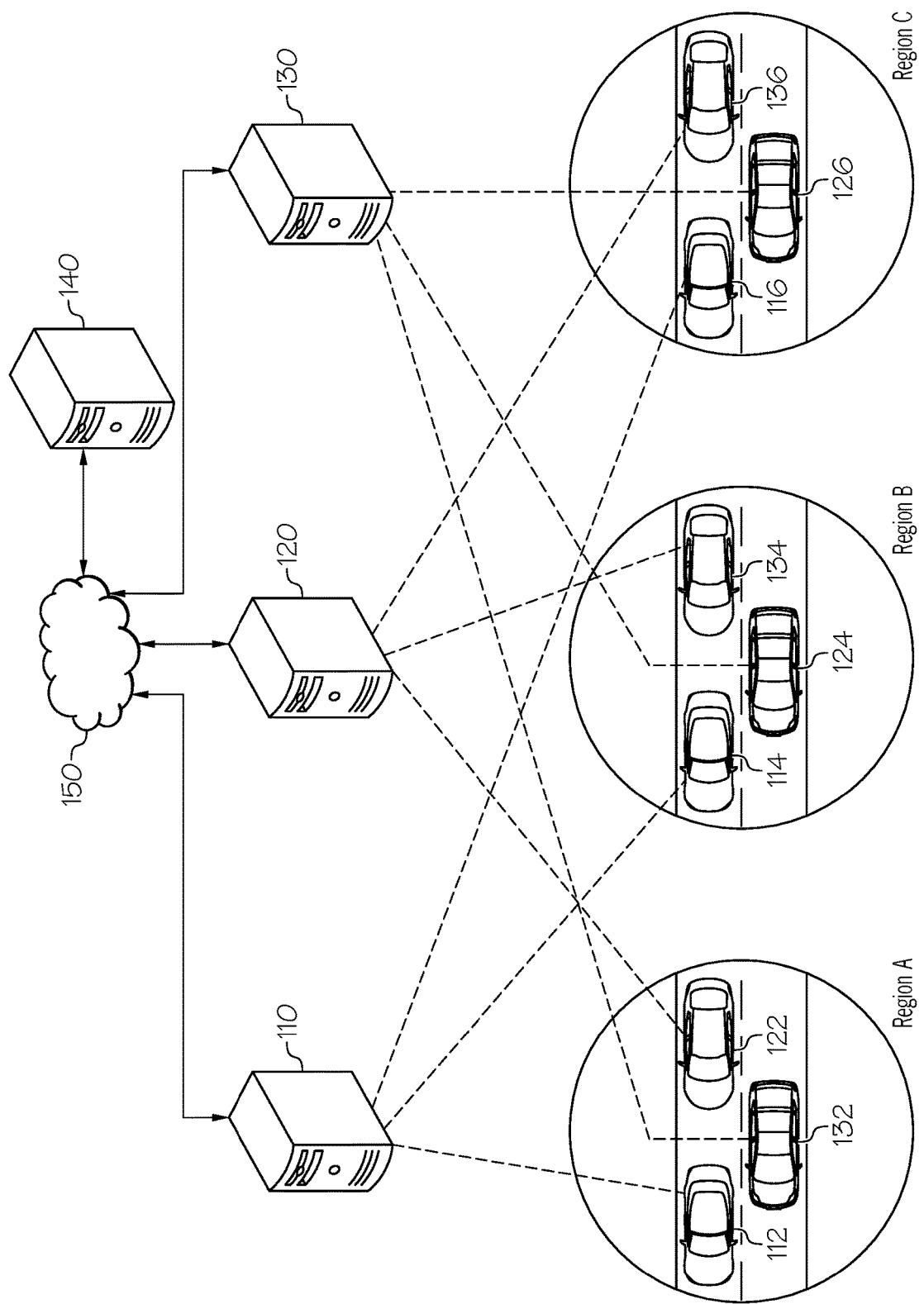
FIG. 1A schematically depicts a system for collecting data from a plurality of vehicles, according to one or more embodiments shown and described herein.

FIG. 1A schematically depicts a system for collecting data from a plurality of vehicles, according to one or more embodiments shown and described herein.

A plurality of servers 110, 120, and 130 communicate with a plurality of vehicles. The group of vehicles may be in different regions. For example, vehicles 112, 122, 132 are located in region A, vehicles 114, 124, 134 are located in region B, and vehicles 116, 126, 136 are located in region C. While FIG. 1A depicts three regions, more than or less than regions may be allocated to evaluate behavior of vehicles in each regions. Each of the plurality of servers 110, 120, and 130 may communicate with a certain group of vehicles and collect data from the group of vehicles. For example, the server 110 may communicate with vehicles 112, 114, 116, the server 120 may communicate with vehicles 122, 124, 126, and the server 130 may communicate with vehicles 132, 134, 136. The plurality of servers 110, 120, and 130 may belong to different entities, e.g., different companies, and the data collected by the plurality of servers 110, 120, and 130 may be in different formats, languages, and the like. In some embodiments, the plurality of servers 110, 120, and 130 may receive data from vehicles via edge computing devices such as road side units that are located proximate the vehicles.

Each of the plurality of servers 110, 120, and 130 may receive raw traffic data from the plurality of vehicles. The raw traffic data may include, but is not limited to, positions, orientations, speeds, accelerations, fuel consumptions, emissions, lane information, steering angles, input acceleration pedal forces, input braking forces, and the like. The raw traffic data may be stored as log files in corresponding server. For example, the server 110 may store log files for the vehicles 112, 114, 116, the server 120 may store log files for the vehicles 122, 124, 126, and the server 130 may store log files for the vehicles 132, 134, 136. In embodiments, the plurality of servers 110, 120, and 130 may store information about a road, such as road topology (e.g., highways, intersections, ramps, or the like) and map information. In some embodiments, each of the plurality of servers 110, 120, and 130 may store pre-assigned road topology.

Each of the plurality of servers 110, 120, and 130 may store the collected data, and transmit the collected data to a computing device 140 via a network 150 in response to a request for data from the computing device 140. The computing device 140 may receive data about behavior of the plurality of vehicles and evaluate the behavior of the plurality of data using evaluation modules stored in the computing device 140. The details of the computing device 140 will be described below with reference to FIG. 1B.

Figure 1B:
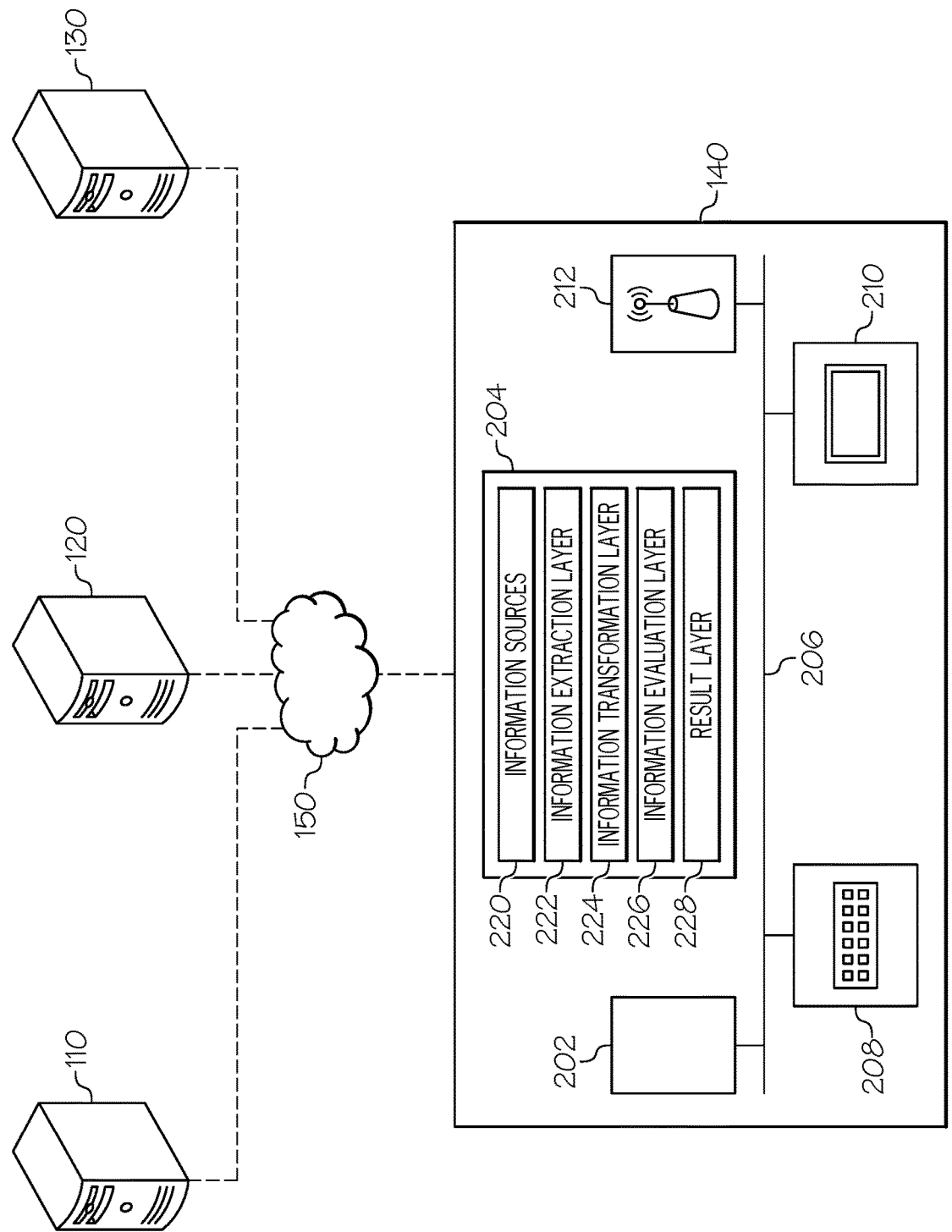
FIG. 1B schematically depicts internal components of a computing device for evaluating behavior of vehicles, according to one or more embodiments shown and described herein.

Referring now to FIG. 1B, various internal components of the computing device 140 are illustrated. The computing device 140 includes one or more processors 202 and one or more memory modules 204, one or more input devices 208, a screen 210, and network interface hardware 212. In some embodiments, the one or more processors 202, and the one or more memory modules 204 may be provided in a single integrated circuit (e.g., a system on a chip). In some embodiments, the one or more processors 202, and the one or more memory modules 204 may be provided as separate integrated circuits. A communication path 206 interconnects the one or more processors 204, the one or more memory modules 204, the one or more input devices 208, the screen 210, and the network interface hardware 212.

Each of the one or more processors 202 is configured to communicate with electrically coupled components, and may be configured as any commercially available or customized processor suitable for the particular applications that the computing device 140 is designed to operate. Each of the one or more processors 202 may be any device capable of executing machine readable instructions. Accordingly, each of the one or more processors 202 may be a controller, an integrated circuit, a microchip, a computer, or any other computing device. The one or more processors 202 are coupled to a communication path 206 that provides signal interconnectivity between various modules of the computing device 140. The communication path 206 may communicatively couple any number of processors with one another, and allow the modules coupled to the communication path 206 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 206 may be formed from any medium that is capable of transmitting a signal such as, for example, conductive wires, conductive traces, optical waveguides, or the like. Moreover, the communication path 206 may be formed from a combination of mediums capable of transmitting signals. In one embodiment, the communication path 206 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules 204 may be coupled to the communication path 206. The one or more memory modules 204 may include a volatile and/or nonvolatile computer-readable storage medium, such as RAM, ROM, flash memories, hard drives, or any medium capable of storing machine readable instructions such that the machine readable instructions can be accessed by the one or more processors 202. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, user-oriented programming (OOP), scripting languages, microcode, etc., that may be compiled or assembled into machine readable instructions and stored on the one or more memory modules 204. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 204 may be configured to store one or more modules, each of which includes the set of instructions that, when executed by the one or more processors 202, cause the computing device 140 to carry out the functionality of the module described herein. In embodiments, the one or more memory modules 204 may be configured to store an information sources module 220, an information extraction layer module 222, an information transformation layer module 224, an information evaluation layer module 226, and a result layer module 228. It should be understood that in some embodiments, the one or more memory modules 204 may be configured to store only a subset of the information sources module 220, the information extraction layer module 222, the information transformation layer module 224, the information evaluation layer module 226, and the result layer module 228. Other data may be stored in the one or more memory modules 204 to provide support for functionalities described herein.

The information sources module 220 is configured to receive log files for a plurality of vehicles from a plurality of servers and store the data. The information sources module 220 may store the log files for a plurality of vehicles from the plurality servers in separate memory spaces, respectively. The separate memory spaces may be associated with the identification of the plurality of servers. For example, log files received from the server 110 may be stored in a memory space A associated with the identification of the server 110. Similarly, log files received from the server 120 may be stored in a memory space B associated with the identification of the server 120.

The information extraction layer module 222 is configured to extract parameters for evaluation from the log files in the information sources module 220. For example, the information extraction layer module 222 may extract parameters from the log files for a plurality of vehicles stored the information sources module 220. The parameters may include, but are not limited to, vehicle identifications, vehicle locations, estimated vehicle positions, estimated vehicle orientations, map information, and the like. The parameters may include also time series and time intervals. A time series is a combination of a parameter value and corresponding time. For example, for a vehicle located at a position P1 at time T1, the time series includes P1 along with T1. Similarly, for the vehicle located at position P2 at time T2, and the time series includes P2 along with T2 with respect to the vehicle. A time interval is a set of a pair of values corresponding to the interval. For example, the time interval includes a start time and an end time of a certain event such as changing lanes. Specifically, if a vehicle starts a lane change at time $t_1$, and ends the lane change at time $t_5$, the time interval includes $t_1$ as a start time parameter and $t_5$ as an end time parameter.

The information transformation layer module 224 is configured to interpolate the parameters extracted by the information extraction layer module 222. For example, for a vehicle A, if the location of the vehicle A at times $t_1$ and $t_3$ are known, but the location of the vehicle A at time $t_2$ is not known, the information transformation layer module 224 may interpolate the location of the vehicle A at time $t_2$ based on the locations of the vehicle A at times $t_1$ and $t_3$. In some embodiments, the information translation layer 224 may be used to change the interpretation of some data. For example, the information transformation layer 224 may transform some positions of objects from a sensor frame to a vehicle frame. In some embodiments, the information translation layer 224 may be used for implementing other functions, such as recomputing the position of a vehicle based on time series information obtained through data channels corresponding to multiple sensor inputs.

The information evaluation layer module 226 is configured to evaluate behavior of vehicles based on the parameters extracted by the information extraction layer module 222 and/or the parameters interpolated by the information transformation layer module 224. The details of evaluating behavior of vehicles will be described below with reference to FIGS. 2, 3A, and 3B.

The result layer module 228 is configured to output the result of the evaluation conducted by the information evaluation layer module 226. For example, the result layer module 228 may transmit the result to the screen 210 such that the screen 210 displays the result. As another example, the result layer module 228 may transmit the result to the network interface hardware 212 such that the network interface hardware 212 may transmit to the server 110, 120, or 130.

The computing device 140 includes an input device 208 coupled to the communication path 206 such that the communication path 206 communicatively couples the input device 208 to other modules of the computing device 140. The input device 208 may be a keyboard or a mouse with which a user can provide an input, for example, entering a request for evaluating lane change behavior of vehicles in zone A, or whether a vehicle identified in zone B properly keeps its lane. In some embodiments, the input device 208 may include a microphone configured for receiving user voice commands and/or other inputs to the computing device 140. The microphone transforms acoustic vibrations received by the microphone into a speech input signal.

The computing device 140 includes the screen 210 coupled to the communication path 206 such that the communication path 206 communicatively couples the screen 210 to other modules of the computing device 140. The screen 210 may display information about behavior evaluation results in response to the request from the user.

The computing device 140 includes the network interface hardware 212 for communicatively coupling the computing device 140 with the plurality of servers 110, 120, 130. The network interface hardware 212 may be coupled to the communication path 206 and may be configured as a wireless communications circuit such that the computing device 140 may communicate with external systems and devices. The network interface hardware 212 may include a communication transceiver for sending and/or receiving data according to any wireless communication standard. For example, the network interface hardware 212 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. The network interface hardware 212 may receive log files from the plurality of servers 110, 120, 130 via a network 150.

Figure 2:
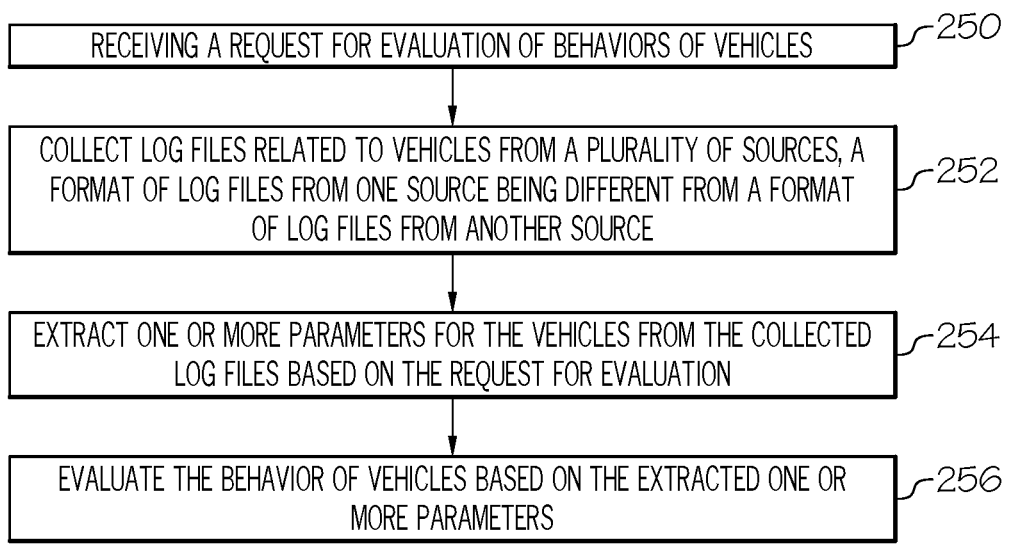
FIG. 2 depicts a flowchart for evaluating behavior of vehicles using a computing device, according to one or more embodiments shown and described herein.

FIG. 2 depicts a flowchart for evaluating behavior of vehicles using a computing device, according to one or more embodiments shown and described herein.

In step, 250, the computing device 140 receives a request for evaluation of behaviors of vehicles. For example, a user of the computing device 140 may input a request for evaluation of behavior of vehicles through the input device 208. The request for evaluation of behavior may include various evaluations including, but not limited to, whether vehicles properly change lanes, whether vehicles properly keep their road lanes, whether vehicles maintain proper distances among vehicles, whether vehicles follow traffic rules, whether there was a vehicle accident, and the like. The request for evaluation may include a certain area where behavior of vehicles are to be evaluated. For example, by referring to FIGS. 1A and 1B, the user may input, through the input device 208, a request for evaluating whether vehicles properly change lanes in region A. As another example, the user may input, through the input device 208, a request for evaluating whether vehicles in region B maintain a proper inter-vehicle distance.

Referring back to FIG. 2, in step 252, the computing device 140 collects log files related to vehicles from a plurality of sources. For example, by referring to FIG. 1B, the computing device 140 collects logs files from the servers 110, 120, 130, respectively in response to the request for evaluation. Log files may include information about vehicles collected by the servers 110, 120, 130. For example, the information about vehicles may include positions, orientations, speeds, accelerations, fuel consumptions, emissions, lane information, steering angles, input acceleration pedal forces, input braking forces, and the like. A format of log files from one source is different from a format of log files from another source. For example, the format of log files collected by the server 110 may be different form the format of log files collected by the server 120 or 130. Thus, in order to extract parameters from different formats of log files, different extractors that are capable of processing corresponding format of log files may be needed.

Referring back to FIG. 2, in step 254, the computing device 140 extracts one or more parameters for the vehicles from the collected log files based on the request for evaluation. For example, by referring to FIG. 3A, the computing device 140 may include a plurality of information extractors such as information extractors 322, 324, 326. The information extractors 322, 324, 326 may be included in the information extraction layer module 222 in FIG. 1B. The information extractors 322, 324, 326 may be previously created by software engineers and stored in a software engineering domain. The user of the computing device 140 does not need to create a software program for extracting relevant vehicle parameters from different information sources. The information extractor 322 is configured to extract vehicle parameters from the log files in the information source 312. Similarly, the information extractor 324 is configured to extract vehicle parameters from the log files in the information source 314. The information extractor 326 is configured to extract vehicle parameters from the log files in the information source 316.

Each of the information extractors 322, 324, 326 may extract vehicle parameters relevant to the request for evaluation received in step 250. In embodiments, if the request for evaluation is a request for evaluating whether vehicles change lanes properly, each of the information extractors 322, 324, 326 may extract vehicle positions at different times, vehicle orientations at different times, a map for an area where vehicles are located, and the like. Specifically, if the request for evaluation is a request for evaluating whether vehicles change lanes properly, the information extractor 322 may extract parameters including estimated vehicle poses, map information, detected vehicles, and actual vehicle positions. Actual vehicle positions may include positions of vehicles. For example, the information extractor 322 may extract positions of the vehicles 112, 114, 116 at time $t_1$. Detected vehicles may include identifications about vehicles. Identifications may include license plate numbers, vehicle types, vehicle colors, vehicles models, or the like. For example, the information extractor 322 may extract information about the vehicles 112, 114, 116. Map information includes a map for an area where vehicles are located. For example, if the request evaluation is a request evaluating behavior of vehicles in region A, the information extractor 322 may extract map information for region A. Estimated vehicle poses include estimated vehicle positions and estimated vehicle orientations. The estimated vehicle positions and estimated vehicle orientations may be obtained based on the actual locations and orientations of vehicles. Similarly, the information extractor 324 may extract parameters for vehicles 122, 124, 126, and the information extractor 326 may extract parameters for vehicles 132, 134, 136.

In some embodiments, if the request for evaluation is a request for evaluating whether vehicles keep their lanes, each of the information extractors 322, 324, 326 may extract vehicle positions at different times, centerlines of lanes on which the vehicles drive, a map for an area where the vehicles are located, and the like.

Referring back to FIG. 2, in step 256, the computing device 140 evaluates the behavior of vehicles based on the extracted one or more parameters. The details of evaluating the behavior of vehicles will be described below with reference to FIGS. 3A and 3B.

Figure 3A:
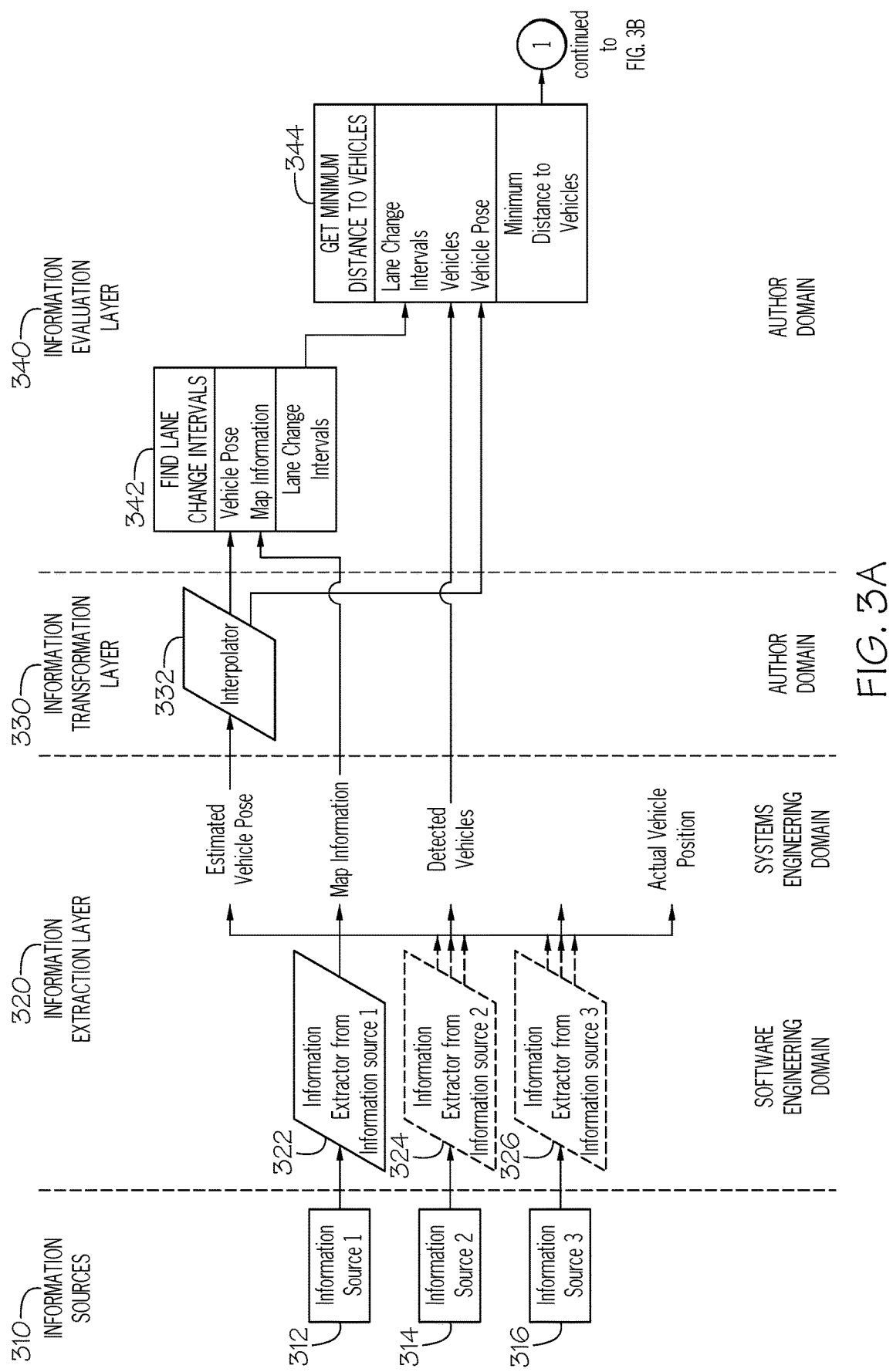
FIG. 3A depicts pipeline diagrams for evaluating behavior of vehicles using a computing device, according to one or more embodiments shown and described herein.
Figure 3B:
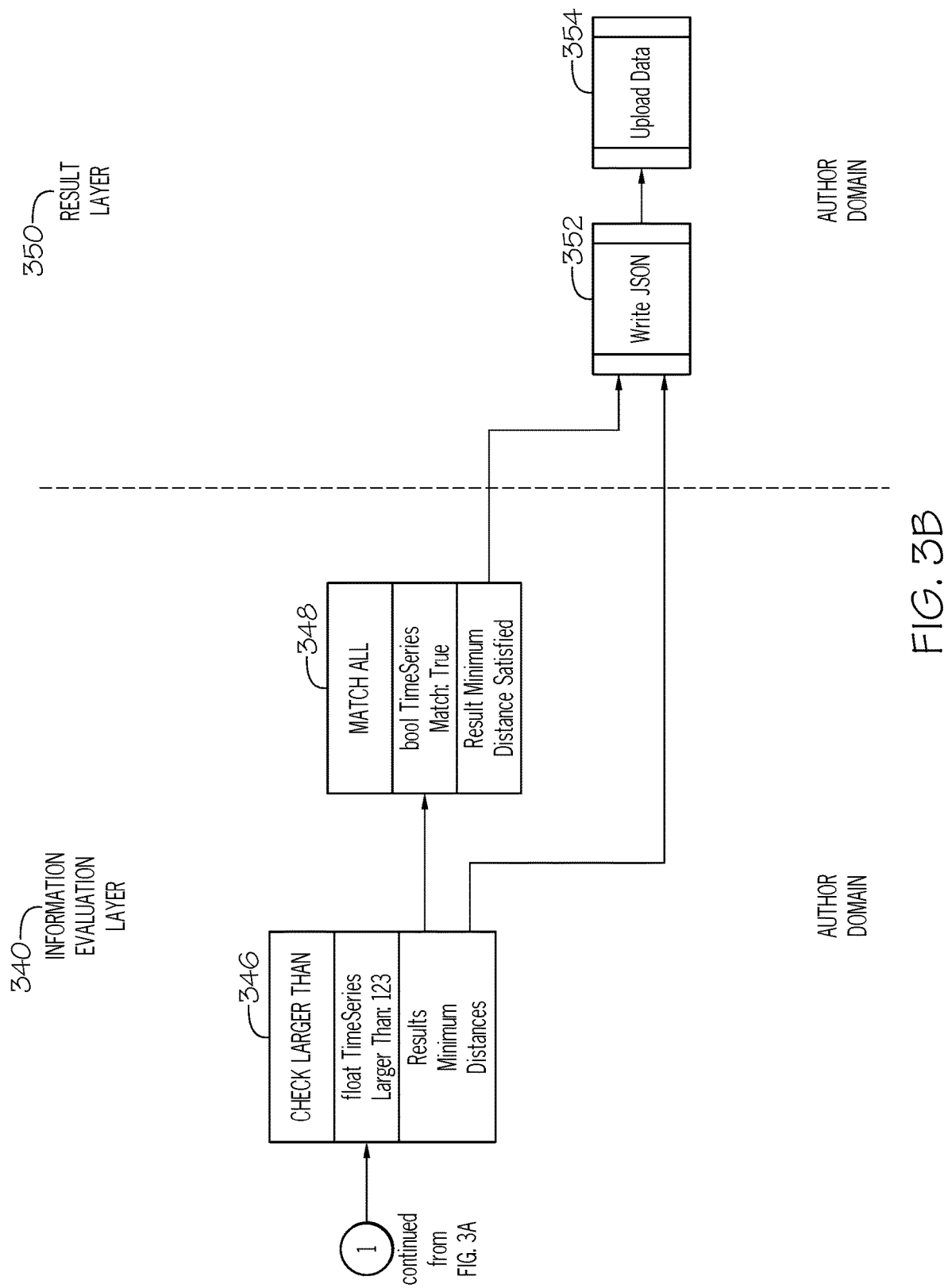
FIG. 3B depicts pipeline diagrams for evaluating behavior of vehicles using a computing device, according to one or more embodiments shown and described herein.

FIGS. 3A and 3B depict an evaluation pipeline diagram, according to one or more embodiments shown and described herein. The diagram includes information sources 310, an information extraction layer 320, an information transformation layer 330, an information evaluation layer 340, and a result layer 350.

The information sources 310 include a plurality of information sources 312, 314, 316, each of which include log files of different formats. For example, the information source 312 includes log files from the server 110 in FIG. 1A, the information source 314 includes log files from the server 120 in FIG. 1A, and the information source 316 includes log files from the server 130 in FIG. 1A. The format of log files stored in the information source 312 may be different form the format of log files stored in the information source 314 or 316.

The information extraction layer 320 includes a plurality of information extractors 322, 324, 326. As described above, the information extractor 322 is configured to extract vehicle parameters from the log files in the information source 312. Similarly, the information extractor 324 is configured to extract vehicle parameters from the log files in the information source 314. The information extractor 326 is configured to extract vehicle parameters from the log files in the information source 316. Each of the information extractor 322, 324, 326 is adopted to extract parameters from corresponding format of log files.

Figure 4A:
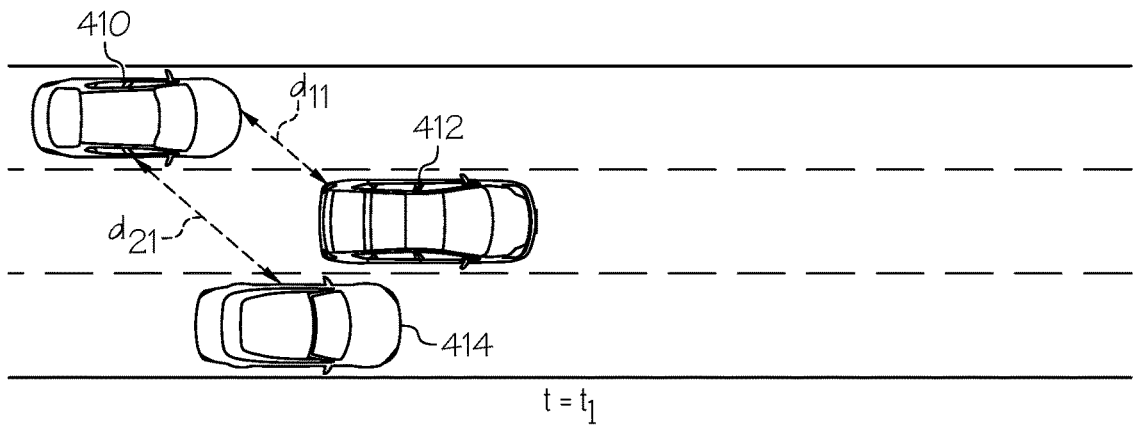
FIG. 4A depicts evaluating lane changing behavior of one of a plurality of vehicles, according to one or more embodiments shown and described herein.
Figure 4B:
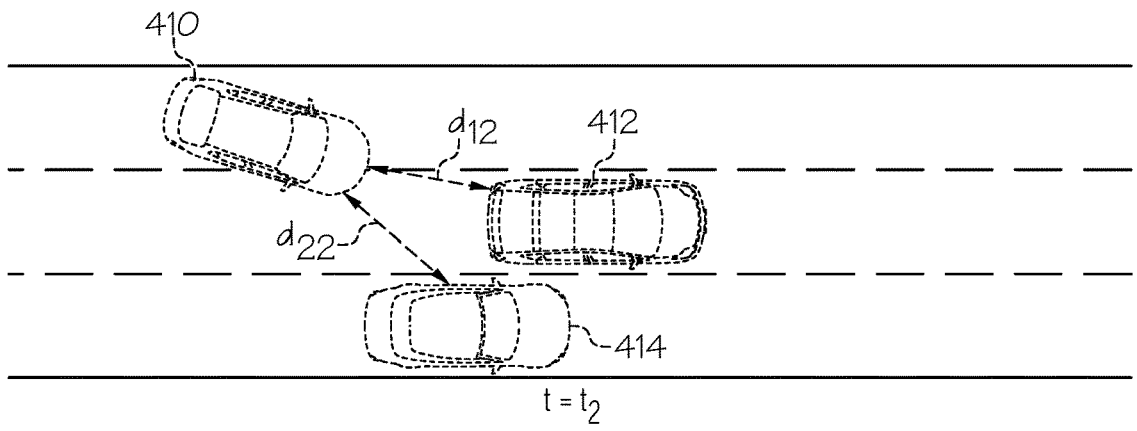
FIG. 4B depicts evaluating lane changing behavior of one of a plurality of vehicles, according to one or more embodiments shown and described herein.

The information transformation layer 330 includes an interpolator 332. The interpolator 332 interpolates vehicle parameters which were not initially extracted by the information extractors. For example, the information extractor 322 extracts positions and orientations of vehicles at time $t_1$ and $t_3$, but does not extract positions and orientations of vehicles at time $t_2$. The interpolator may interpolate the positions and orientations of the vehicles at time $t_2$ based on the positions and orientations of vehicles at time $t_1$ and $t_3$. Specifically, by referring to FIGS. 4A and 4C, the information extractor 322 may extract positions and orientations of vehicles 410, 412, 414 at time $t_1$ and time $t_3$. Based on the positions and orientations of vehicles 410, 412, 414 at time $t_1$ and time $t_3$, the interpolator 332 may interpolate the positions and orientations of the vehicles at time $t_2$ as illustrated in FIG. 4B.

Referring back to FIGS. 3A-3B, the information evaluation layer 340 includes a plurality of blocks 342, 344, 346, and 348. The block 342 finds lane change intervals based on vehicle pose parameters and map information. Specifically, the block 342 receives vehicle pose parameters and map information from the information extractors 322, 324, 326 and/or the interpolator 332 and outputs lane change intervals. For example, by referring to FIGS. 4A through 4E, in order to determine a lane change interval for the vehicle 410, the block 342 may monitor positions of the vehicle 410 on a road based on the map information at different times including $t_1, t_2, t_3, t_4, t_5$. Based on the positions, the block 342 may determine that the vehicle 410 initiates lane changing at time $t_1$ and finishes lane changing at time $t_5$. That is, the $t_1$ is a lane change start time and $t_5$ is a lane change end time. In this regard, the block 342 may determine that the lane change interval is $t_1$ through $t_5$. Similarly, the block 342 may determine a lane change interval for the vehicle 412 or 414 if the lane change activity of the vehicle 412 or 414 is detected.

Figure 4C:
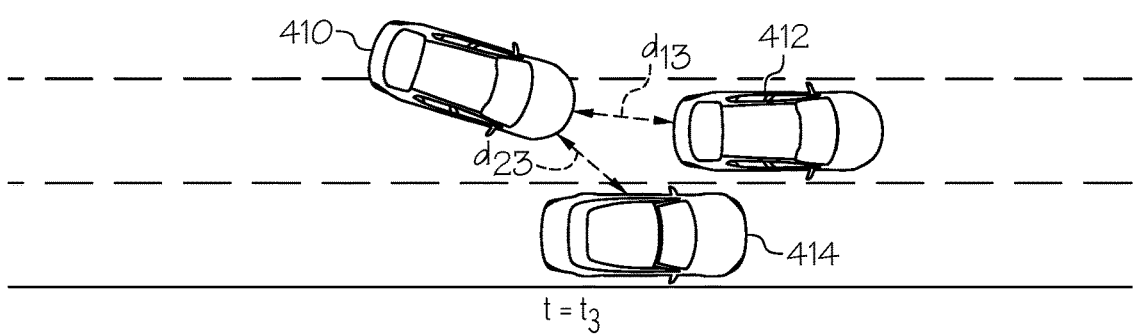
FIG. 4C depicts evaluating lane changing behavior of one of a plurality of vehicles, according to one or more embodiments shown and described herein.
Figure 4D:
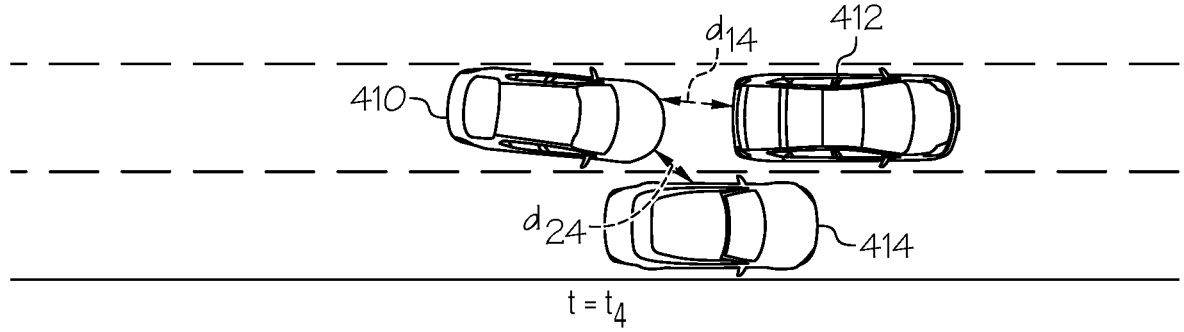
FIG. 4D depicts evaluating lane changing behavior of one of a plurality of vehicles, according to one or more embodiments shown and described herein.
Figure 4E:
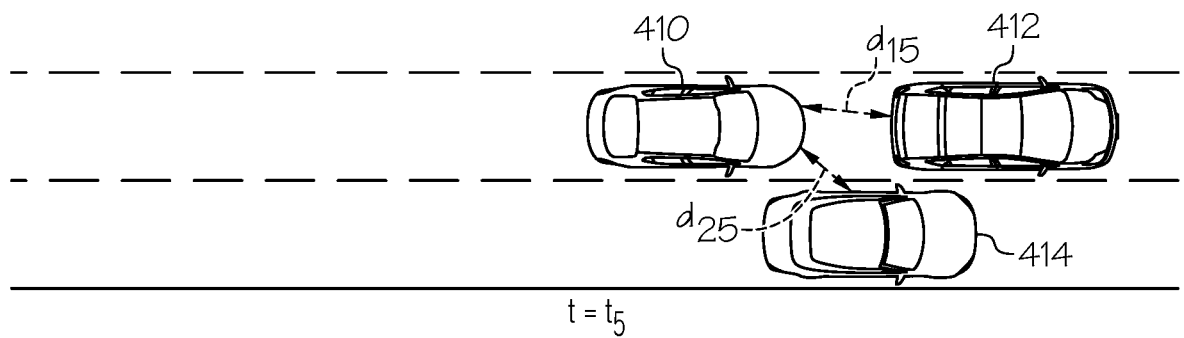
FIG. 4E depicts evaluating lane changing behavior of one of a plurality of vehicles, according to one or more embodiments shown and described herein.

The block 344 obtains a minimum distance to vehicles. The block 344 receives lane change intervals from the block 342, detected vehicles, and vehicle poses of the detected vehicles, and outputs a minimum distance to vehicles. For example, the block 344 obtains a distance $d_{11}$ between the vehicle 410 and the vehicle 412 and a distance $d_{21}$ between the vehicle 410 and the vehicle 414 at time $t_1$ as illustrated in FIG. 4A based on the positions of the vehicles 410, 412, 414. In this example, the distance $d_{11}$ may be the minimum distance between the distance $d_{11}$ and the distance $d_{21}$. Similarly, the block 344 obtains a distance $d_{12}$ between the vehicle 410 and the vehicle 412 and a distance $d_{22}$ between the vehicle 410 and the vehicle 414 at time $t_2$ as illustrated in FIG. 4B based on the interpolated positions of the vehicles 410, 412, 414. In this example, the distance $d_{12}$ may be the minimum distance between the distance $d_{12}$ and the distance $d_{22}$. The block 344 obtains a distance $d_{13}$ between the vehicle 410 and the vehicle 412 and a distance $d_{23}$ between the vehicle 410 and the vehicle 414 at time $t_3$ as illustrated in FIG. 4C based on the positions of the vehicles 410, 412, 414. In this example, the distance $d_{23}$ may be the minimum distance between the distance $d_{13}$ and the distance $d_{23}$. The block 344 obtains a distance $d_{14}$ between the vehicle 410 and the vehicle 412 and a distance $d_{24}$ between the vehicle 410 and the vehicle 414 at time $t_4$ as illustrated in FIG. 4D based on the positions of the vehicles 410, 412, 414. In this example, the distance $d_{24}$ may be the minimum distance between the distance $d_{14}$ and the distance $d_{24}$. The block 344 obtains a distance $d_{15}$ between the vehicle 410 and the vehicle 412 and a distance $d_{25}$ between the vehicle 410 and the vehicle 414 at time $t_5$ as illustrated in FIG. 4E based on the positions of the vehicles 410, 412, 414. In this example, the distance $d_{25}$ may be the minimum distance between the distance $d_{15}$ and the distance $d_{25}$.

The block 346 receives the minimum distance output from the block 344 and determines that the minimum distance is greater than a threshold distance. For example, the threshold distance may be 1 foot, 2 feet, or any other customized number. The block 346 may determine whether the minimum distance $d_{11}$ is larger than threshold distance. Similarly, the block 346 may determine whether the minimum distances $d_{12}, d_{23}, d_{24}, d_{25}$ is greater than the threshold distance.

The block 348 determines whether each of the minimum distances is greater than the threshold distance during the time interval. For example, the block 348 determines whether all the minimum distances during the lane change interval are greater than the threshold distance. If all the minimum distances $d_{11}, d_{12}, d_{23}, d_{24}, d_{25}$ during the lane change interval $t_1$ through $t_5$ are greater than the threshold distance, the block 348 outputs that the minimum distance is satisfied. The block 348 may output that the lane change of the vehicle 410 has been properly executed. The block 348 outputs the result of the determination and transmits to the result to the result layer 350.

The result layer 350 may include blocks 352 and 354. The results are placed into a format, e.g., a format of blocks that may be provided to the user of the computing device 140. For example, the result in the format of blocks may be displayed on the screen 210. The block 352 writes the result in the JavaScript Object Notation (JSON) format and provides to the data to the block 354 which uploads the data to an external device such as the servers 110, 120, and 130.

According to the present disclosure, a user having little programming experience may be able to take a series of blocks such as blocks 342, 344, 346, 348 having defined parameters and put the blocks together in order to build a desired evaluation.

Figure 5:
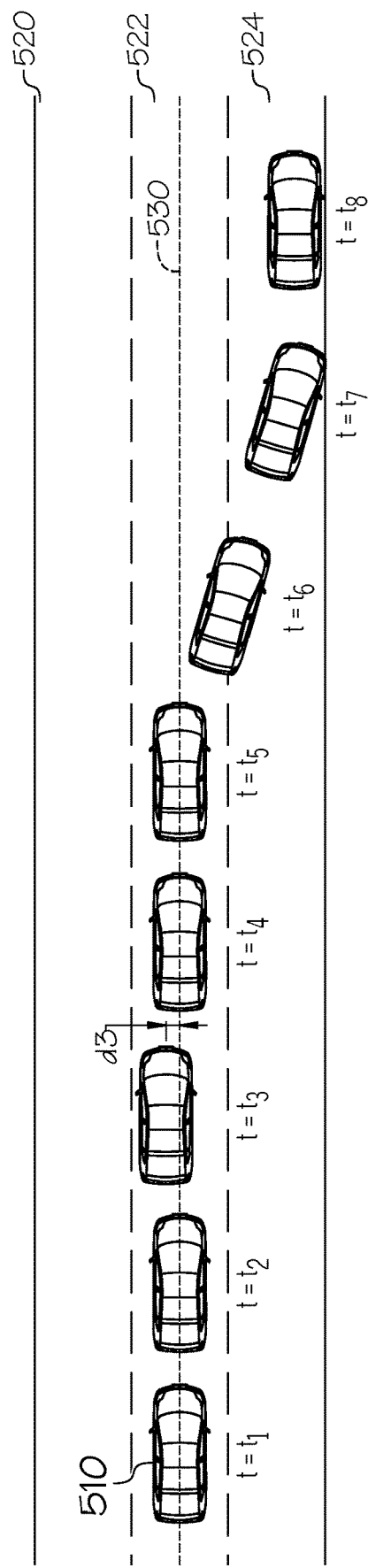
FIG. 5 depicts evaluating lane maintenance behavior of a vehicle, according to one or more embodiments shown and described herein.

In some embodiments, the evaluation pipeline diagram may be set for evaluating whether a vehicle properly keeps a lane. By referring to FIGS. 3A and 5, one of the information sources 312, 314, 316 may include a log file for the vehicle 510 in FIG. 5. One of the information extractors 322, 324, 326 may extract parameters from the log file for the vehicle 510. The extracted parameters may include estimated vehicle pose, map information, a centerline of the lane on which the vehicle is driving, and the like. For example, the extracted parameters may include the vehicle locations of the vehicle 510 at different times. The extracted parameters may also include map information including a road on which the vehicle 510 is driving, a lane 522 on which the vehicle is driving, and a center line 530 of the lane 522.

The interpolator 332 interpolates vehicle parameters which were not initially extracted by the information extractors. For example, the information extractor 322 extracts positions and orientations of vehicles at time $t_1$, $t_2$, $t_3$, and $t_5$, but does not extract positions and orientations of vehicles at time $t_4$. The interpolator may interpolate the positions and orientations of the vehicles at time $t_4$ based on the positions and orientations of vehicles at time $t_1$, $t_2$, $t_3$ and $t_5$.

The information evaluation layer 340 includes a plurality of blocks 342, 344, 346, and 348. The block 342 finds lane maintenance intervals based on vehicle pose parameters and map information. Specifically, the block 342 receives vehicle pose parameters and map information for the vehicle 510 from one of the information extractors 322, 324, 326 and/or the interpolator 332 and output lane maintenance intervals. For example, by referring to FIG. 5, in order to determine a lane maintenance interval for the vehicle 510, the block 342 may monitor positions of the vehicle 410 on a road based on the map information at different times including $t_1$, $t_2$, $t_3$, $t_4$, $t_5$, $t_6$, $t_7$, $t_8$. Based on the positions, the block 342 may determine that the vehicle 510 initiates lane maintenance at time $t_1$ and finishes lane maintenance at time $t_5$, and initiates lane change at time $t_5$ and finishes lane change at time $t_6$. That is, the $t_1$ is a lane maintenance start time and $t_5$ is a lane maintenance end time. In this regard, the block 342 may determine that the lane maintenance interval is $t_1$ through $t_5$.

The block 344 obtains a deviation distance d3 between the center line 530 and the center of the vehicle 510. The block 344 receives the lane maintenance interval from the block 342, vehicle location of the vehicle 510, and outputs a deviation distance d3. For example, the block 344 obtains the deviation distance d3 between the center of the vehicle 510 and the center line 530 at time $t_1$. Similarly, the block 344 obtains the deviation distance d3 between the center of the vehicle 510 and the center line 530 at times $t_2$ through $t_5$.

The block 346 receives the distances d3 at different times output from the block 344 and determines that each of the distances d3 is smaller than a threshold distance. The threshold distance may be, for example, 0.5 foot, 1 foot, or any other customized number.

The block 348 determines whether each of the distance d3 at different times $t_1$ through $t_5$ is smaller than the threshold distance. The block 348 outputs the result of the determination and transmits to the result to the result layer 350. The results are placed into a format, e.g., a format of blocks that may be provided to the user of the computing device 140. For example, the result in the format of blocks may be displayed on the screen 210. The block 352 writes the result in the JavaScript Object Notation (JSON) format and provides to the data to the block 354 which uploads the data to an external device such as the servers 110, 120, and 130. The format of the result is not limited to JSON format, and may be other formats such as YAML (YAML Ain't Markup Language), or some proprietary formats.

It should be understood that embodiments described herein are directed to methods and systems for evaluating behavior of vehicles. The system includes an input device configured to receive a request for evaluation of behavior of vehicles, one or more processors, one or more memory modules communicatively coupled to the one or more processors, and machine readable instructions stored in the one or more memory modules that, when executed by the one or more processors, cause the system to: collect log files related to vehicles from a plurality of sources, a format of log files from one source being different from a format of log files from another source, extract one or more parameters for the vehicles from the collected log files based on the request for evaluation, and evaluate behavior of the vehicles based on the extracted one or more parameters. The one or more parameters include time series and time intervals. While the present disclosure describes evaluating behavior of changing lanes or behavior of keeping a lane, behavior to be evaluated by the present disclosure is not limited thereto. For example, the present system may evaluate behavior of vehicles in traffic incidents, behavior of vehicles in construction sites, behavior of vehicles making a U-turn, behavior of vehicles at a stop sign, and the like.

The present system allows individuals that are unfamiliar with programming to prepare schemes for complex evaluations of vehicle behavior. Embodiments of the present disclosure include a scheme that allows non-programmers or programmers having little experience to take a series of blocks having defined parameters and put the blocks together in order to build a desired evaluation. Accordingly, systems engineers with little programming experience can assemble a requirement for testing of vehicle behavior in an efficient and accurate manner It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for evaluating behavior of vehicles, the system comprising:
 an input device configured to receive a request for evaluation of behavior of vehicles;
 a first memory space storing a first set of log files related to a first set of vehicles collected by a first server, the first set of log files formatted in a first format;
 a second memory space storing a second set of log files related to a second set of vehicles collected by a second server, the second memory space being separate from the first memory space, and the second set of log files formatted in a second format;
 a controller programmed to:
  collect the first set of log files related to the first set of vehicles and collect the second set of log files related to the second set of vehicles, the first format of the first set of log files stored in the first memory space being different from the second format of the second set of log files stored in the second memory space;
  extract one or more parameters for the first set of vehicles from the collected first set of log files using a first information extractor adopted to extract parameters from the first format of log files and extract the one or more parameters for the second set of vehicles from the collected second set of log files using a second information extractor adopted to extract parameters from the second format of log files;

interpolate the extracted one or more parameters based on the extracted parameters for different times; and evaluate behavior of the vehicles based on the extracted one or more parameters, wherein the extracted one or more parameters include time series and time intervals.

2. The system of claim 1, wherein the controller is programmed to:

evaluate lane change behavior of the vehicles based on the extracted one or more parameters.

3. The system of claim 1, wherein the extracted one or more parameters include at least one of a vehicle speed, a vehicle orientation, a vehicle location, and map information.

4. The system of claim 1, wherein:

the controller is programmed to determine a lane change start time and a lane change end time of a vehicle based on a map, locations of the vehicle on the map at different times, and orientation of the vehicle at the different times, the time intervals include a lane change interval, and the lane change interval is determined based on the lane change start time and the lane change end time.

5. The system of claim 4, wherein the controller is programmed to:

determine whether a minimum distance between the vehicle and other vehicles during the lane change interval is less than a threshold distance; and output a notification in response to determination that the minimum distance between the vehicle and other vehicles during the lane change interval is less than the threshold distance.

6. The system of claim 1, wherein each of the time series includes a parameter in association with a time stamp.

7. The system of claim 1, wherein the controller is programmed to:

determine whether a vehicle deviates from a centerline of a road based on the extracted one or more parameters.

8. The system of claim 7, wherein:

the controller is programmed to determine a lane maintenance start time and a lane maintenance end time of a vehicle based on a map, locations of the vehicle on the map at different times, and orientation of the vehicle at the different times, the time intervals include a lane maintenance interval, and the lane maintenance interval is determined based on the lane maintenance start time and the lane maintenance end time.

9. The system of claim 8, wherein the controller is programmed to:

determine whether a difference between a center of the vehicle deviates and the centerline of the road is greater than a threshold deviation during the lane maintenance interval, and output a notification in response to determination that the difference between a center of the vehicle deviates and the centerline of the road is greater than the threshold deviation during the lane maintenance interval.

10. A method for evaluating behavior of vehicles, the method comprising:

storing, in a first memory space, a first set of log files related to a first set of vehicles collected by a first server, the first set of log files formatted in a first format;

storing, in a second memory space, a second set of log files related to a second set of vehicles collected by a second server, the second memory space being separate from the first memory space, and the second set of log files formatted in a second format;

collecting the first set of log files related to the first set of vehicles and collecting the second set of log files related to the second set of vehicles, the first format of the first set of log files stored in the first memory space being different from the second format of the second set of log files stored in the second memory space;

extracting one or more parameters for the first set of vehicles from the collected first set of log files using a first information extractor adopted to extract parameters from the first format of log files and extracting the one or more parameters for the second set of vehicles from the collected second set of log files using a second information extractor adopted to extract parameters from the second format of log files;

interpolating the extracted one or more parameters based on the extracted parameters for different times; and evaluating behavior of the vehicles based on the extracted one or more parameters, wherein the extracted one or more parameters include time series and time intervals.

11. The method of claim 10, wherein evaluating behavior of the vehicles based on the extracted one or more parameters comprises:

evaluating lane change behavior of the vehicles based on the extracted one or more parameters.

12. The method of claim 11, further comprising:

determining a lane change start time and a lane change end time of a vehicle based on a map, locations of the vehicle on the map at different times, and orientation of the vehicle at the different times, wherein the time intervals include a lane change interval, and the lane change interval is determined based on the lane change start time and the lane change end time.

13. The method of claim 12, further comprising:

determining whether a minimum distance between the vehicle and other vehicles during the lane change interval is less than a threshold distance; and outputting a notification in response to determination that the minimum distance between the vehicle and other vehicles during the lane change interval is less than the threshold distance.

14. The method of claim 10, further comprising:

determining whether a vehicle deviates from a centerline of a road based on the extracted one or more parameters.

15. The method of claim 14, further comprising:

determining a lane maintenance start time and a lane maintenance end time of a vehicle based on a map, locations of the vehicle on the map at different times, and orientation of the vehicle at the different times, wherein the time intervals include a lane maintenance interval, the lane maintenance interval is determined based on the lane maintenance start time and the lane maintenance end time.

16. The method of claim 15, further comprising:

determining whether a difference between a center of the vehicle deviates and the centerline of the road is greater than a threshold deviation during the lane maintenance interval, and outputting a notification in response to determination that the difference between a center of the vehicle deviates and the centerline of the road is greater than the threshold deviation during the lane maintenance interval.

17. A non-transitory computer readable medium having stored thereon software instructions that, when executed by a processor, cause the processor to evaluate behavior of vehicles, by executing steps comprising:
  storing, in a first memory space, a first set of log files related to a first set of vehicles collected by a first server, the first set of log files formatted in a first format;
  storing, in a second memory space, a second set of log files related to a second set of vehicles collected by a second server, the second memory space being separate from the first memory space, and the second set of log files formatted in a second format;
  collecting the first set of log files related to the first set of vehicles and collecting the second set of log files related to the second set of vehicles, the first format of the first set of log files stored in the first memory space being different from the second format of the second set of log files stored in the second memory space;
  extracting one or more parameters for the first set of vehicles from the collected first set of log files using a first information extractor adopted to extract parameters from the first format of log files and extracting the one or more parameters for the second set of vehicles from the collected second set of log files using a second information extractor adopted to extract parameters from the second format of log files;
  interpolating the extracted one or more parameters based on the extracted parameters for different times; and
  evaluating behavior of the vehicles based on the extracted one or more parameters, wherein the extracted one or more parameters include time series and time intervals.

18. The non-transitory computer readable medium of claim 17, wherein the steps further comprise:
  determining a lane change start time and a lane change end time of a vehicle based on a map, locations of the vehicle on the map at different times, and orientation of the vehicle at the different times; and
  determining a lane change interval based on the lane change start time and the lane change end time.

19. The non-transitory computer readable medium of claim 18, wherein the steps further comprise:
  determining whether a minimum distance between the vehicle and other vehicles during the lane change interval is less than a threshold distance; and
  outputting a notification in response to determination that the minimum distance between the vehicle and other vehicles during the lane change interval is less than the threshold distance.

* * * * *